United States Patent
McConnell et al.

(10) Patent No.: US 9,990,204 B2
(45) Date of Patent: Jun. 5, 2018

(54) DATA PROCESSING

(71) Applicant: BluWireless Technology Limited, Bristol (GB)

(72) Inventors: Ray McConnell, Bristol (GB); Ifor Powell, Bristol (GB)

(73) Assignee: BLUWIRELESS TECHNOLOGY LIMITED, Bristol (GB)

( * ) Notice: Subject to any disclaimer, the term of this patent is extended or adjusted under 35 U.S.C. 154(b) by 218 days.

(21) Appl. No.: 15/182,335

(22) Filed: Jun. 14, 2016

(65) Prior Publication Data

US 2016/0364238 A1 Dec. 15, 2016

(30) Foreign Application Priority Data

Jun. 15, 2015 (GB) .................................. 1510437.5

(51) Int. Cl.
*G06F 9/38* (2018.01)
*G06F 9/30* (2018.01)

(52) U.S. Cl.
CPC ........ *G06F 9/3836* (2013.01); *G06F 9/30145* (2013.01); *G06F 9/30156* (2013.01); *G06F 9/3867* (2013.01)

(58) Field of Classification Search
None
See application file for complete search history.

(56) References Cited

U.S. PATENT DOCUMENTS

| 5,930,491 A | * | 7/1999 | Hilgendorf | ........... G06F 9/3017 712/209 |
| 6,453,424 B1 | | 9/2002 | Janniello | |
| 6,775,762 B1 | * | 8/2004 | Miyake | ................. G06F 9/3836 712/215 |

(Continued)

FOREIGN PATENT DOCUMENTS

| EP | 1988460 A1 | 11/2008 |
| GB | 2355094 A | 4/2001 |

(Continued)

OTHER PUBLICATIONS

Int'l Search Report & Written Opinion in PCT/GB2016/051671, dated Sep. 22, 2016.

(Continued)

*Primary Examiner* — Eric Coleman
(74) *Attorney, Agent, or Firm* — Mossman, Kumar & Tyler, PC

(57) ABSTRACT

A processing element comprises a plurality of function units (16) operable to execute respective functions in dependence upon received instructions in parallel with one another. An instruction controller includes a plurality of instruction pipelines (42). Each of the pipelines (42) is associated with a function unit (16) of the processing element, and is operable to deliver instructions to the function unit concerned for execution thereby. Each pipeline also includes a timing controller operable to receive timing information for a received instruction, and to determine an initial location in the pipeline into which the instruction is to be loaded, and (Continued)

an instruction handler operable to receive an instruction for the function unit associated with the instruction pipeline concerned, and to load that instruction into the initial location determined by the timing controller.

11 Claims, 21 Drawing Sheets

(56) References Cited

U.S. PATENT DOCUMENTS

| | | | | |
|---|---|---|---|---|
| 6,813,704 B1* | 11/2004 | Nguyen | ................ | G06F 9/3013 |
| | | | | 712/214 |
| 2003/0135712 A1* | 7/2003 | Theis | .................. | G06F 9/30156 |
| | | | | 712/214 |
| 2011/0238953 A1* | 9/2011 | Metsugi | .............. | G06F 9/30101 |
| | | | | 712/207 |

FOREIGN PATENT DOCUMENTS

| | | |
|---|---|---|
| WO | 0033183 A1 | 6/2000 |
| WO | 0208894 A1 | 1/2002 |

OTHER PUBLICATIONS

Search and Examination Report in GB1510437.5, dated Dec. 30, 2015.

* cited by examiner

|  |  | V3 |  | V2 | V1 |
|---|---|---|---|---|---|
|  |  |  | W1 | W2 |  |
| Z1 | Z3 | Z2 |  |  | Z4 |
| Y1 | Y3 | Y2 |  |  | Y4 |
| X1 | X3 | X2 |  |  | X4 |

FIGURE 7

DATA PROCESSING

The present invention relates to data processing, and in particular to delivery of instructions to parallel function units of a processing element.

BACKGROUND TO THE INVENTION

FIG. 1 of the accompanying drawings illustrates a data processing device 1 having a processing element 10. Each processing element 10 receives data 11 to be processed in accordance with a received instruction 12. The processing element 10 receives a clock signal input 13 for synchronising operation and execution of the received instructions. Following execution of the instruction 12 on the data 11 by the processing element 10, a result 14 is output. The processing element 10 can be arranged to provide any appropriate function or functions.

FIG. 2 of the accompanying drawings illustrates an exemplary processing element 10 which includes a plurality of function units 16 (16A to 16F) which have respective individual functions. For example, a function unit may provide a memory read function, a memory write function, an add function, a divide function, or a multiply function. The plurality of function units 16 can be arranged to provide a desired range of functions. It will be readily appreciated that each function unit may have any appropriate function, and that any appropriate combination of functions may be provided.

A data input 17 delivers data to be processed to the processing element 10, and a multiplexer 18 routes the data to the correct function unit dependent upon the contents of the data being received. An enable signal and a clock signal (not shown in FIG. 2 for the sake of clarity) are provided to the function units. When the enable signal is provided to a function unit, then the function unit executes its function on received data on the next clock cycle or cycles. The number of cycles taken for execution of a particular function is dependent upon that function as is well known.

Following execution of the function, a function unit 16 provides processed data as an output 20 (20A to 20F). These outputs 20 (20A to 20F) are provided as inputs to a multiplexer 21 which operates to select one of the outputs 20 for output from the processing element 10 as an output 22.

In a previously considered processing element, instructions are executed serially in order of receipt, so that only one function unit in the plurality of function units is operating at any one time. This order of execution is determined by the program being executed on the processing device 1. In such an arrangement, only one output 20 is active at any one time, and the multiplexer 21 selects that output 20 as the output from the processing element 10.

In order to provide enhanced processing capabilities, and in order to reduce the need for external memory write and read operations (which add to delay and latency of processing), and to increase the number of instructions executing in parallel in one cycle, a processed data feedback architecture has been proposed for the processing element. FIG. 3 of the accompanying drawings illustrates schematically such an architecture. The processing element 10' of FIG. 3 includes an input multiplexer 24 for supplying data to be processed to the functions units 16. In contrast with the FIG. 2 example, the input multiplexer 24 of the processing element 10' is connected to receive the outputs 22A to 22F of the functions units 16A to 16F. In this manner, the input multiplexer is able to feedback the result of one function unit to one of the function units for further processing in dependence upon the program being executed. In this manner, a series of instructions can be executed without the need for external memory input/output processes and increases the number of instructions executing in parallel in one cycle. Such a technique enables a series of instructions be processed more quickly and with lower delay.

However, when a program contains multiple sequences of instructions, execution of the instruction in a single series can lead to unnecessarily extended delays. In order to overcome this issue, in a paper entitled "Cheap Out-of-Order Execution using Delayed Issue" (0-7695-0801-4/00), J. P. Grossman of the Dept of EECS, MIT, presents a technique in which instruction sequences that are independent of one another are interleaved. In such a technique, instructions are executed such that multiple function units operate in parallel, with the requirement that instructions in a given sequence are executed in the correct order. Grossman achieves this by proposing to delay issuance of instructions to function units and controlling the order in which these instructions are executed. Grossman also discusses applying such a technique to looped instruction sequences. In such a manner it is possible to reduce the overall execution time of the independent instruction sequences.

However, such a technique can still result in unnecessary delays in processing sequences of instructions, particularly if those sequences include looped instructions. The problem is particularly acute in data processing applications where low latency is desirable, if not essential. One example of such an application is in the wireless telecommunications field in which streams of data packets must be processed with low latency whilst maintaining data packet order and low rates of packet dropping.

SUMMARY OF THE INVENTION

The present invention seeks to address the problems of the prior art.

According to one aspect of the present invention, there is provided a method of delivering instructions to a processing element having a plurality of function units arranged in parallel with one another, using an instruction controller having a plurality of instruction pipelines associated with respective function units of the processing element, the method comprising receiving an instruction word, which includes a plurality of instructions, each instruction belonging to an instruction sequence, and having a timing value indicative of a relative timing for execution of the instruction in the instruction sequence to which the instruction belongs; supplying the instructions to respective instruction pipelines of the instruction controller in dependence upon a function of the instruction concerned, the instructions being supplied to respective initial positions within the respective instruction pipelines, the initial positions being determined by the timing value of the instruction concerned, and by relative timing between instruction sequences; and propagating such instructions through the instruction pipelines to respective function units of the processing element, such that the instructions for an instruction sequence are delivered to the associated function units for execution in an order determined by the timing value for the instructions of that instruction sequence.

In one example, the instructions are supplied to the instruction pipeline such that delay between processing micro instructions in adjacent instruction sequences is minimized.

In one example, the initial timing positions are determined such that adjacent instruction sequences do not overlap in time on any one processing channel.

In one example, wherein the processing channel comprises a series of storage units, each of which is operable to store an instruction for a predetermined number of system clock cycles, and wherein the method includes, after a predetermined number of system clock cycles, for each such unit except the last in the series, passing a stored instruction the next unit in the series, and, for the last unit in the series, passing a instruction to the processing unit associated with the processing channel concerned.

In one example, relative timing between instruction sequences is determined by detecting a position in at least one instruction pipeline for an instruction belonging to a first instruction sequence, detecting whether an instruction from a second instruction sequence is destined for execution at the same function unit as an instruction from the first instruction sequence, and, if so, determining a position in the pipeline such that the second instruction sequence does not overlap in time with the first instruction sequence.

According to another aspect of the present invention, there is provided an instruction controller for supplying instructions to a processing element having a plurality of function units operable to execute respective functions in dependence upon received instructions in parallel with one another, the controller comprising a plurality of function units operable to execute respective functions in dependence upon received instructions in parallel with one another; and a plurality of instruction pipelines, each of which is associated with a function unit, and is operable to deliver instructions to the an associated function unit of a processing element concerned for execution thereby, each instruction having a sequence value indicative of belonging to an instruction sequence to which the instruction belongs, and having a timing value indicative of a relative timing for execution of the instruction in the instruction sequence to which the instruction belongs, wherein each instruction pipeline comprises a plurality of storage units, arrange in a series and operable to store an instruction therein, each storage unit, except the last in the series, being operable to transfer an instruction to the next unit in the series, the last unit in the series being operable to transfer an instruction to the an associated function unit of a processing element associated with the instruction pipeline concerned; a timing controller operable to receive timing information for a received instruction, and to determine an initial storage unit into which the instruction is to be loaded, the initial storage unit being determined by the timing value of the instruction concerned, and by relative timing between instruction sequences; an instruction handler operable to receive an instruction for the function unit associated with the instruction pipeline concerned, and to load that instruction into a storage unit determined by the timing controller; and wherein each instruction pipeline is operable to propagate an instruction from the initial storage unit determined by the timing controller to the a function unit associated with the pipeline concerned.

In one example, the timing controller is operable to determine an initial storage unit for an instruction such that the instructions are supplied to the instruction pipelines such that delay between execution of instructions in adjacent instruction sequences is minimized.

In one example, each instruction pipeline includes a position detector operable to determine a position of an instruction in the instruction pipeline concerned, and to transmit position information to the timing controllers of the instruction pipelines, and wherein the timing controllers are operable to use received position information in determining the initial storage unit for an instruction.

In one example, the timing controller of each pipeline is operable to determine relative timing between instruction sequences by detecting a position in at least one instruction pipeline for an instruction belonging to a first instruction sequence, detecting whether an instruction from a second instruction sequence is destined for execution at the same function unit as an instruction from the first instruction sequence, and, if so, determining a position in the pipeline such that the second instruction sequence does not overlap in time with the first instruction sequence.

BRIEF DESCRIPTION OF THE DRAWINGS

An embodiment of the invention will now be described, by way of example only, and with reference to the accompanying drawings, in which:

FIG. 7 illustrates a plurality of instructions sequences;

DETAILED DESCRIPTION OF THE INVENTION

Figure 1:
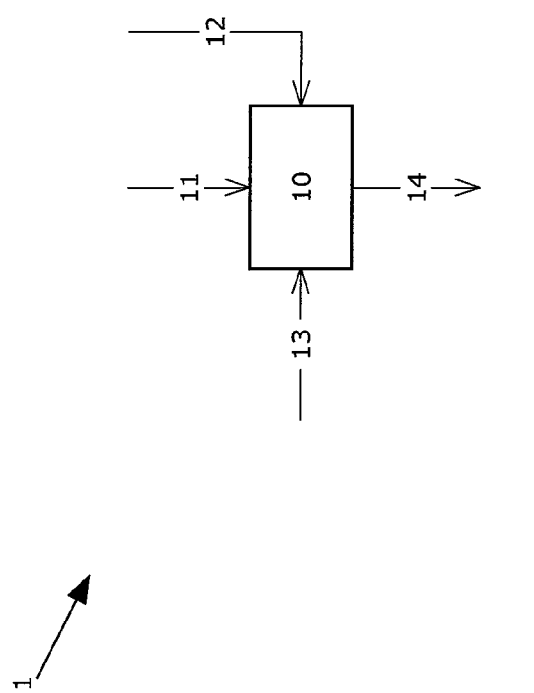
FIG. 1 illustrates schematically a simple data processor.
Figure 2:
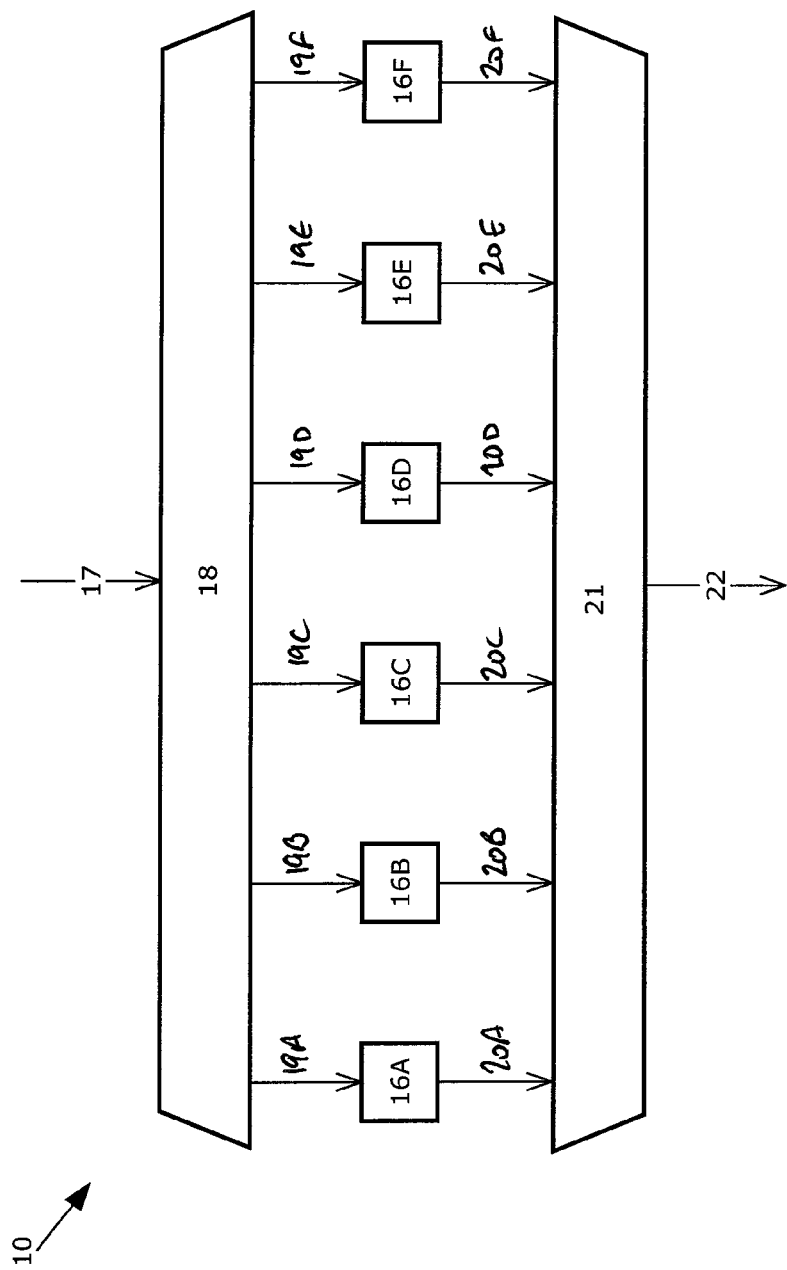
FIG. 2 illustrates schematically a processing element.
Figure 3:
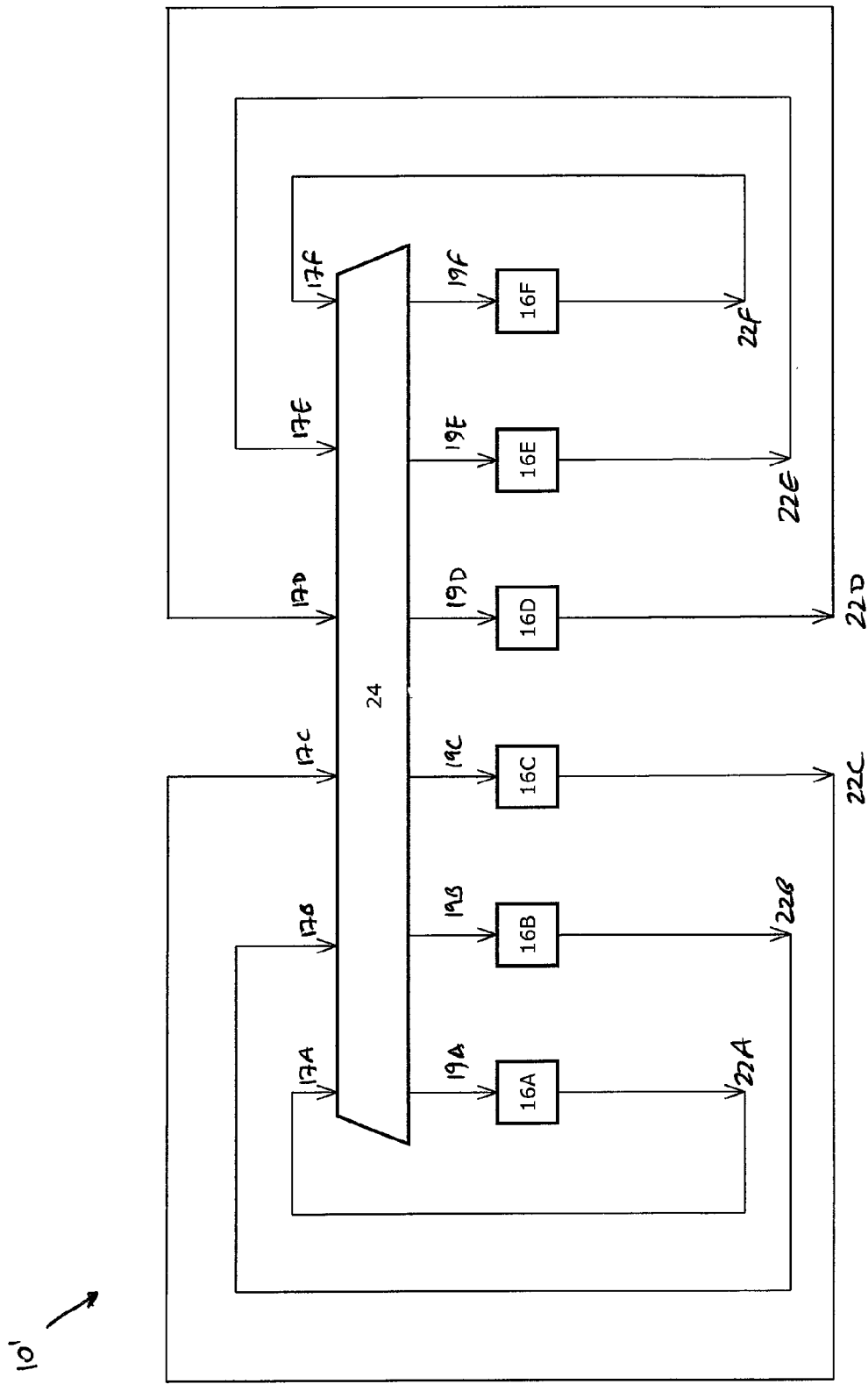
FIG. 3 illustrates schematically a second processing element.

As described above, FIG. 3 illustrates a processing element 10' comprising a plurality of function units 16 (16A to 16F) connected to receive respective data items 19 (19A to 19F) via an input multiplexer 24, and to output respective processed data items 22A to 22. The function unit outputs 22A to 22F may be supplied to the input multiplexer 24 for supply to the function units 16A to 16F for further processing in accordance with the instruction sequence received by the processing element 10'. One or more of the outputs 22A to 22F may be supplied out of the processing element 10' as an output of the processing element 10'

In an embodiment of the present invention, the outputs 22A to 22F of the function units 16A to 16F are made available at the output of the functions units from generation until the function unit concerned executes another instruction. In this way, the processed data is available locally within the processing element until needed. In another example embodiment, the function units may provide one or more registers or local storage elements for holding processed data locally in the processing element.

The function units 16A to 16F are arranged to receive sequences of instructions in order to perform the overall desired function. In one example embodiment of the present invention, these instructions are provided in the form of a compacted instruction word, such as is illustrated in FIG. 4.

Figure 4:
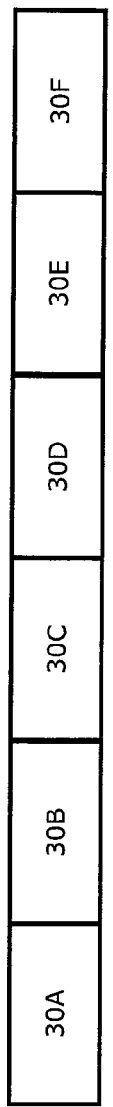
FIG. 4 illustrates a compacted instruction word.

The compacted instruction word 30 in FIG. 4 includes an instruction 30A to 30F for each of the function units 16A to 16F of the processing element 10'. For any given instruction sequence, the instruction field 30A to 30F may include an instruction or may be empty.

Figure 5:
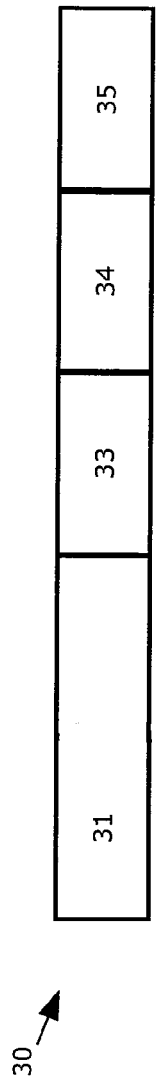
FIG. 5 illustrates an instruction from the compacted instruction word of FIG. 4.

FIG. 5 illustrates an example of an instruction for one function unit of the compacted instruction word of FIG. 4. The instruction comprises an enable/type field 31, first and second data fields 33 and 34, and a timing field 35. It will be readily appreciated that the structure illustrated in FIG. 5 is merely exemplary and is intended to enable explanation of the principles of the present invention. Other instruction field formats and contents may be used as appropriate.

When supplied to the function unit 16 to which the instruction relates, the enable/type field 31 causes the function unit 16 to become active, and defines the particular type of function to be executed. For example, a multiply function may relate to a "simple" multiplication or to a floating point multiplication. The enable/type field 31 is decoded by the function unit 16 upon receipt by the unit.

Each instruction belongs to an instruction sequence determined by the overall program being executed.

The first and second data fields 33 and 34 indicate the data to be used for the instruction execution. The fields 33 and 34 may include the data itself, or may include a reference to a location of the data, such as a memory or register location for the data.

The timing field 35 includes information relating to the relative timing of the instruction in the instruction sequence to which the particular instruction belongs.

Figure 6:
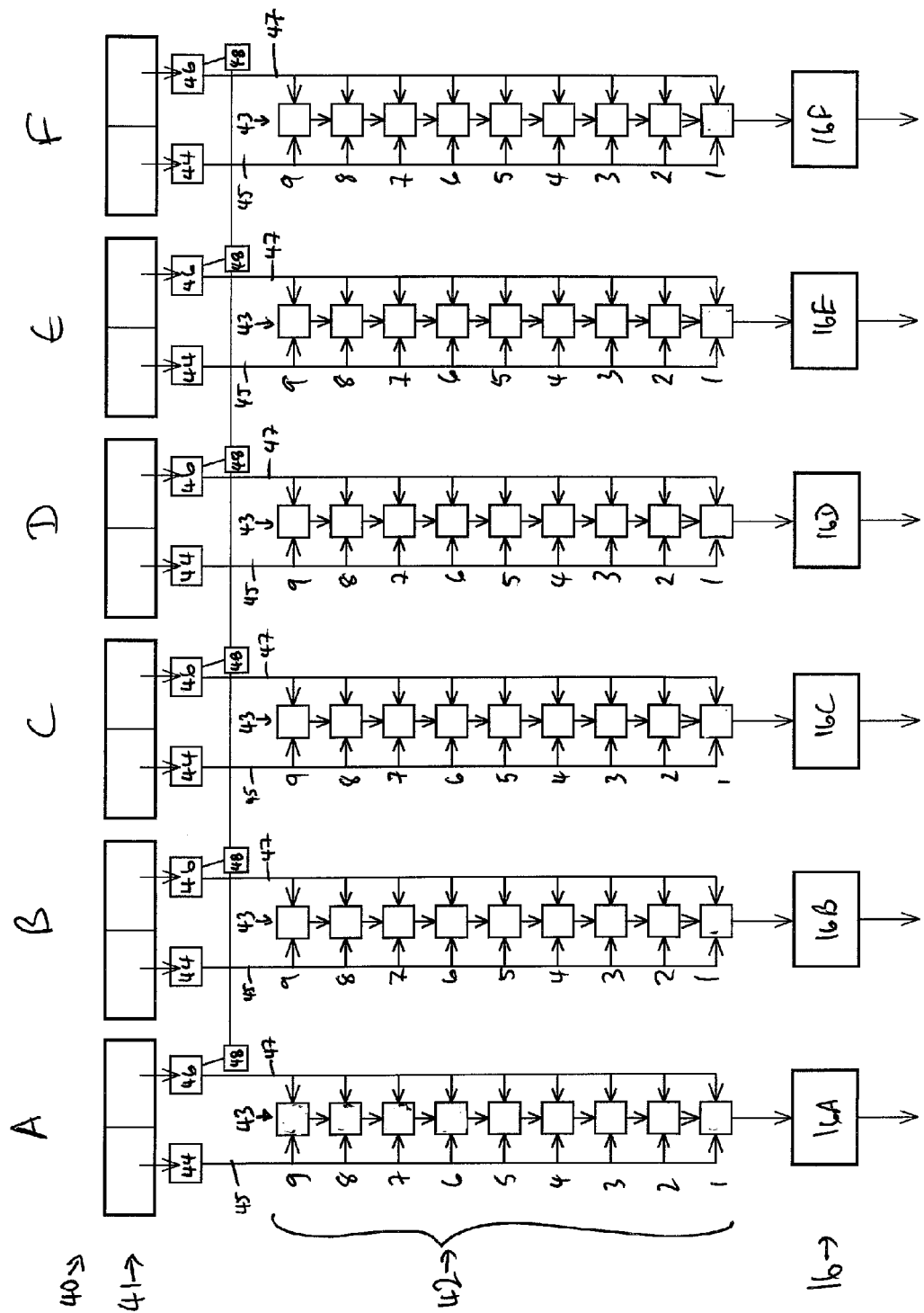
FIG. 6 illustrates an instruction pipeline for use with the function units of FIG. 2.

FIG. 6 illustrates schematically an instruction controller 40 embodying one aspect of the present invention in combination with a processing element having a plurality of function units 16. The instruction controller 40 operates to receive compacted instructions, to expand and schedule those instructions and to deliver the instructions to the function units 16A to 16F for execution. The instruction controller 40 is arranged in a plurality of columns—one for each of the function units 16A to 16F. These columns are labelled A to F in FIG. 6.

For the sake of clarity, FIG. 6 illustrates the controller 40 arranged to deliver instructions to a single processing element. However, it will be appreciated that the instruction controller is also able to deliver the same instructions to a plurality of processing elements, thus providing a SIMD (single instruction multiple data) processing architecture. The description below of the operation of the controller 40 is set out with reference to a single processing element, but applies to the SIMD architecture.

The columns of the instruction controller 40 are identical to one another. A column includes an instruction register 41 into which an instruction is input. Since a compacted instruction word is used to provide the instructions for execution, the instruction register for each of the columns is loaded with the next instruction field for processing at the same time.

A column also includes an instruction pipeline 42 which is operable to deliver the instructions to the associated function unit 16. The instruction pipeline 42 comprises a plurality of storage units 43 which are connected in a series. In FIG. 6, each pipeline 42 comprises nine storage units 43, but any number of units may be provided. Each storage unit 43 in the series, except the last in the series, is operable to store an instruction and to pass that instruction to the next unit in the series on receipt of a clock pulse signal. The last storage unit 43 in the series is operable to pass the instruction to the function unit 16 associated with the pipeline 42.

An instruction handler 44 is operable to retrieve the instruction for the column concerned from the instruction register 41, and to transfer that retrieved instruction to an appropriate one of the storage units 43 in the pipeline 42 via an instruction delivery bus 45. A timing controller 46 detects the timing information (35, FIG. 5) of an instruction and is operable to cause the instruction handler 44 to deliver the instruction to the correct storage unit 43 in the pipeline 42. A position detector 48 provides synchronisation information to the timing controller 46 in order to enable synchronisation of delivery of instructions to the pipeline 42 across different instruction sequences. Operation of the pipeline 42 will be described below in more detail.

Instructions are supplied to the instruction register as a series of compacted instruction words. Such a series is illustrated in FIG. 7, in which each instruction has been simplified for the sake of clarity. Each instruction comprises the instruction fields set out in FIG. 5, but the FIG. 7 representation shows only the instruction sequence to which the instruction belongs and the timing field 35 for the sake of clarity.

In FIG. 7, the instruction sequence is represented by a letter—v, w, x, y, z, and the timing field 35 is represented by an integer—1 to 4. It will be readily appreciated that the representations of the sequences and timings shown here are purely exemplary and have been simplified for the sake of the clarity of the description of the principles of the invention. It will also be readily appreciated that any number of sequences may be supplied to the processing element, and each of these sequences may be of any depth. The sequences shown in FIG. 7 are merely exemplary. The example of FIG. 7 gives five sequences to be processed. The individual instructions may be any appropriate type of instruction, as required by the overall processing of the processing element. In this example, the sequences are delivered to the instruction register 41 in the order x, y, z, w, v.

In the example shown in FIG. 7, the first three sequences x, y, z are identical and in effect form a looped sequence. Another way of forming a looped sequence is to repeat a single instruction sequence. The sequences x, y, and z form a super sequence and are identified as such for timing and synchronisation purposes, as will be explained below.

Figure 8:
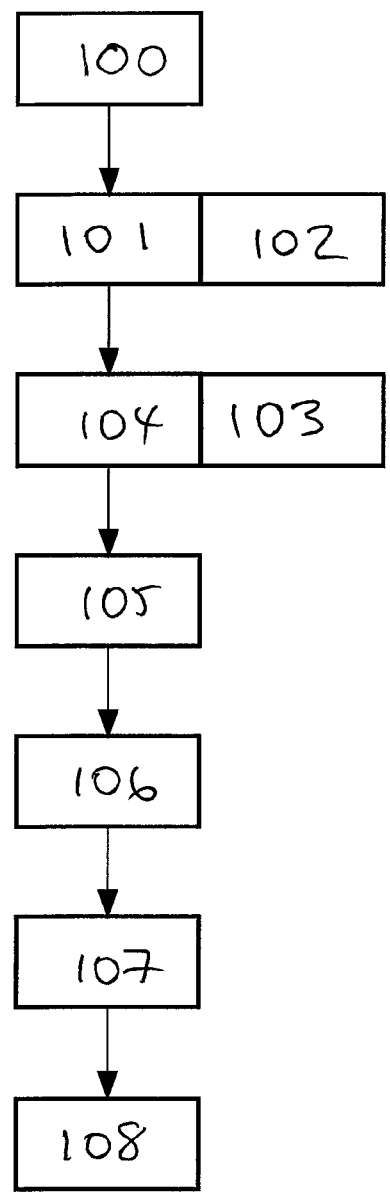
FIG. 8 is a flow chart illustrating steps in a method embodying another aspect of the present invention.

FIG. 8 is a flow chart illustrating steps in a method embodying the present invention for loading and propagating an instruction from the compacted instruction word to the function unit, and will also be referred to in relation to FIGS. 9 to 21.

The compacted instruction word relating to the first sequence (x) is loaded (step 100) into the instruction register 41. On the next clock cycle, respective instructions are loaded (step 101) into the instruction handlers 44. The timing fields 35 are read (102) by the timing controllers 46. In dependence upon the contents of the timing field 35, the appropriate storage unit 43 of the pipeline 42 is enabled (103), such that the instruction handler 44 is able to load (104) the instruction into the storage unit 43 via the delivery bus 45. Loading of the instructions into the storage units 43 is assumed to take a single clock cycle. Following loading, subsequent clock cycles cause the instructions to propagate (105) through the pipelines 42A to 42F until loaded (106) into the function units 16A to 16F.

Once the instructions from the one sequence have been loaded into the appropriate storage units 43, the next sequence can be loaded. During such loading, the instructions reaching the function units 16 are executed and outputs provided.

Figure 9:
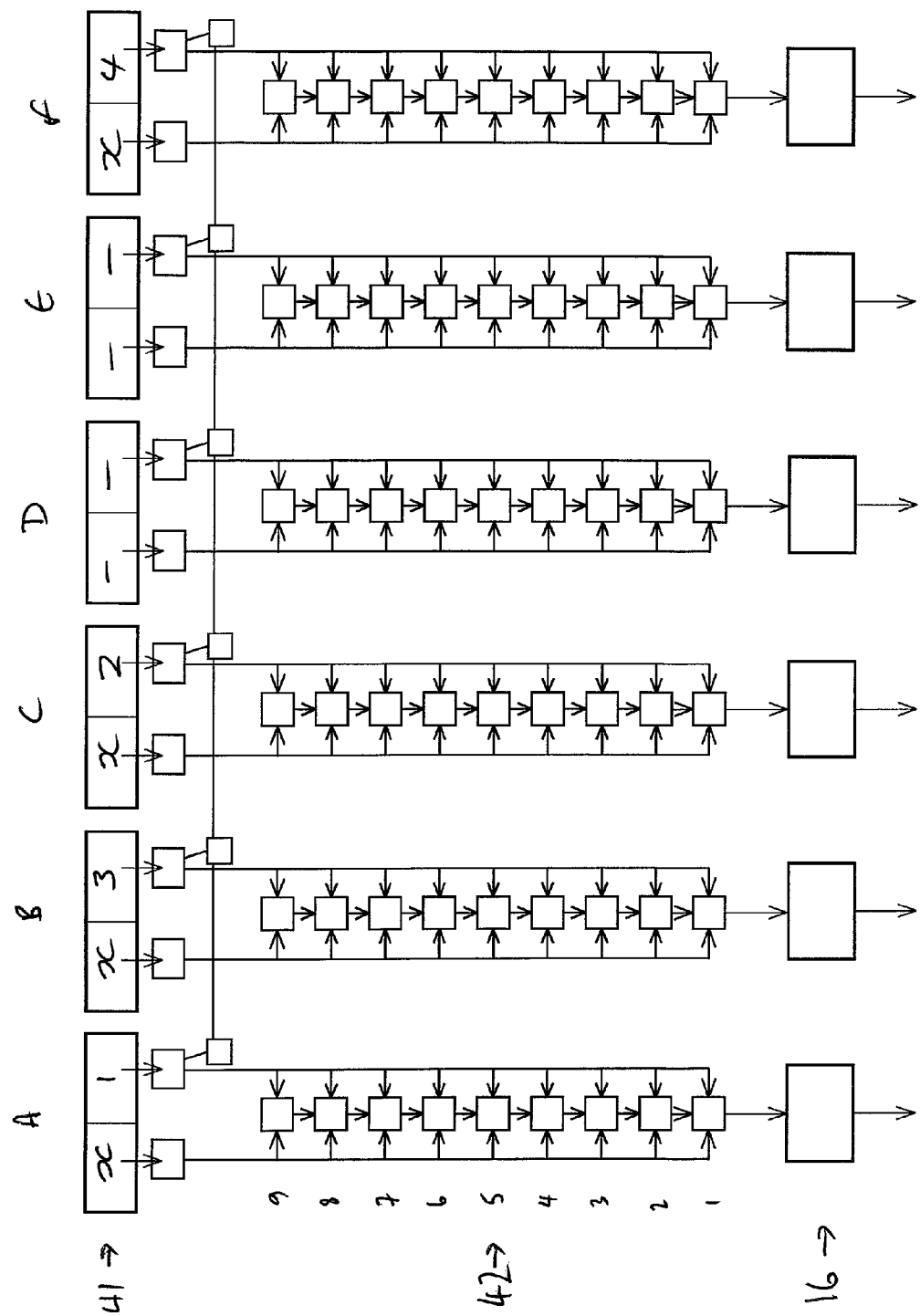
FIGS. 9 to 21 illustrate delivery of instructions from the sequences of FIG. 7 to respective function units.
Figure 10:
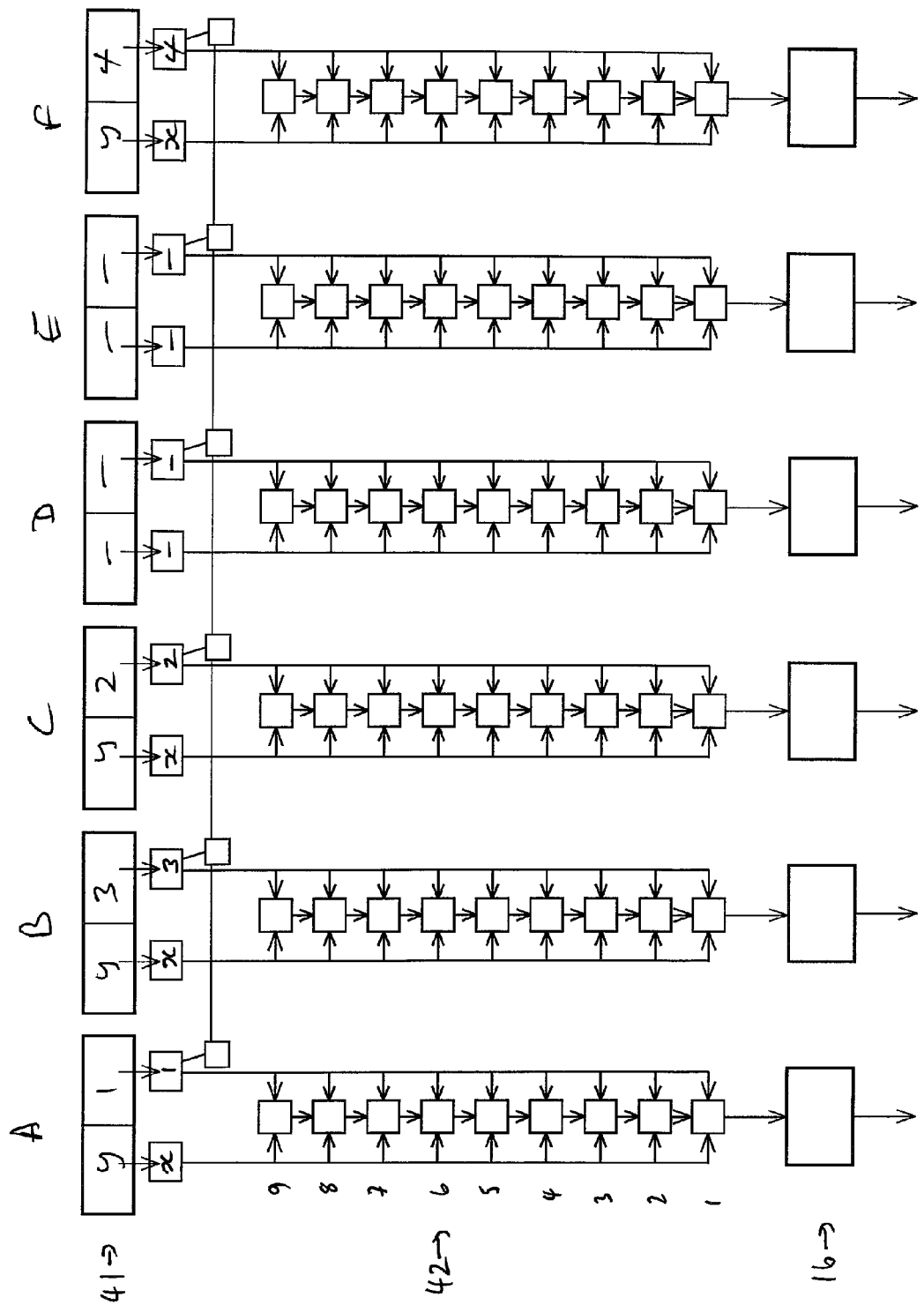

FIGS. 9 to 21 illustrate propagation of instructions from the instruction sequences of FIG. 7 to the functions units 16A to 16F. FIG. 9 shows the compacted instruction word for the first sequence x loaded into the instruction register 41 ready for delivery to the pipeline 42. FIG. 10 shows one clock cycle later with the x-sequence instructions loaded into the instruction handlers 44 and the timing field 35 into the timing controllers 46. The instructions for the second sequence, y, are loaded into the instruction register 41. In the example, the first instruction x1 of the x-sequence is to be executed by the function unit 16A, and so enters column A of the instruction controller 40.

After one clock cycle, and in dependence upon the timing information, the x-sequence instructions are loaded into the appropriate storage units 43, with the y-sequence instructions loaded into the instruction handlers 44 and timing controllers 46, and the z-sequence instructions loaded into the instruction register 41. The timing controllers 46 make use of position information supplied by the position detectors 48, in combination with sequence and timing information to determine the location into which an instruction is to be loaded in the pipeline 42.

Figure 11:
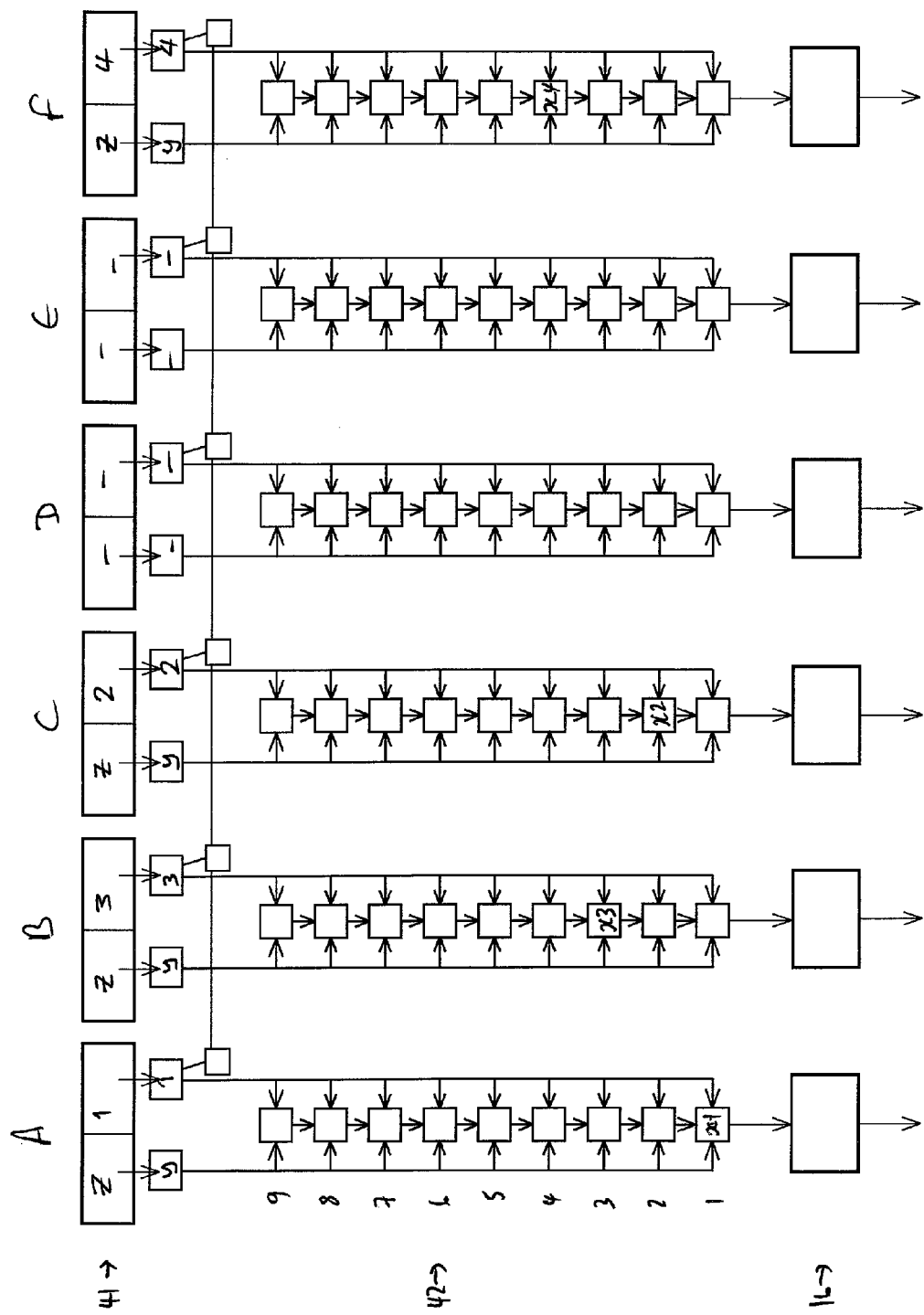

In the example shown in FIG. 11, the first x-sequence instruction x1 is loaded into storage unit 43A1, that is the unit 43 in column A closest to the function unit 16A. The second instruction x2 is loaded into storage unit 43C2, the third instruction x3 into unit 43B3, and the fourth instruction x4 into unit 43F4. The instructions are loaded in this manner in order that they are delivered to the function units 16, and hence are executed, in the correct order for the sequence concerned. This simplified example assumes that each instruction takes a single clock cycle to execute.

Figure 12:
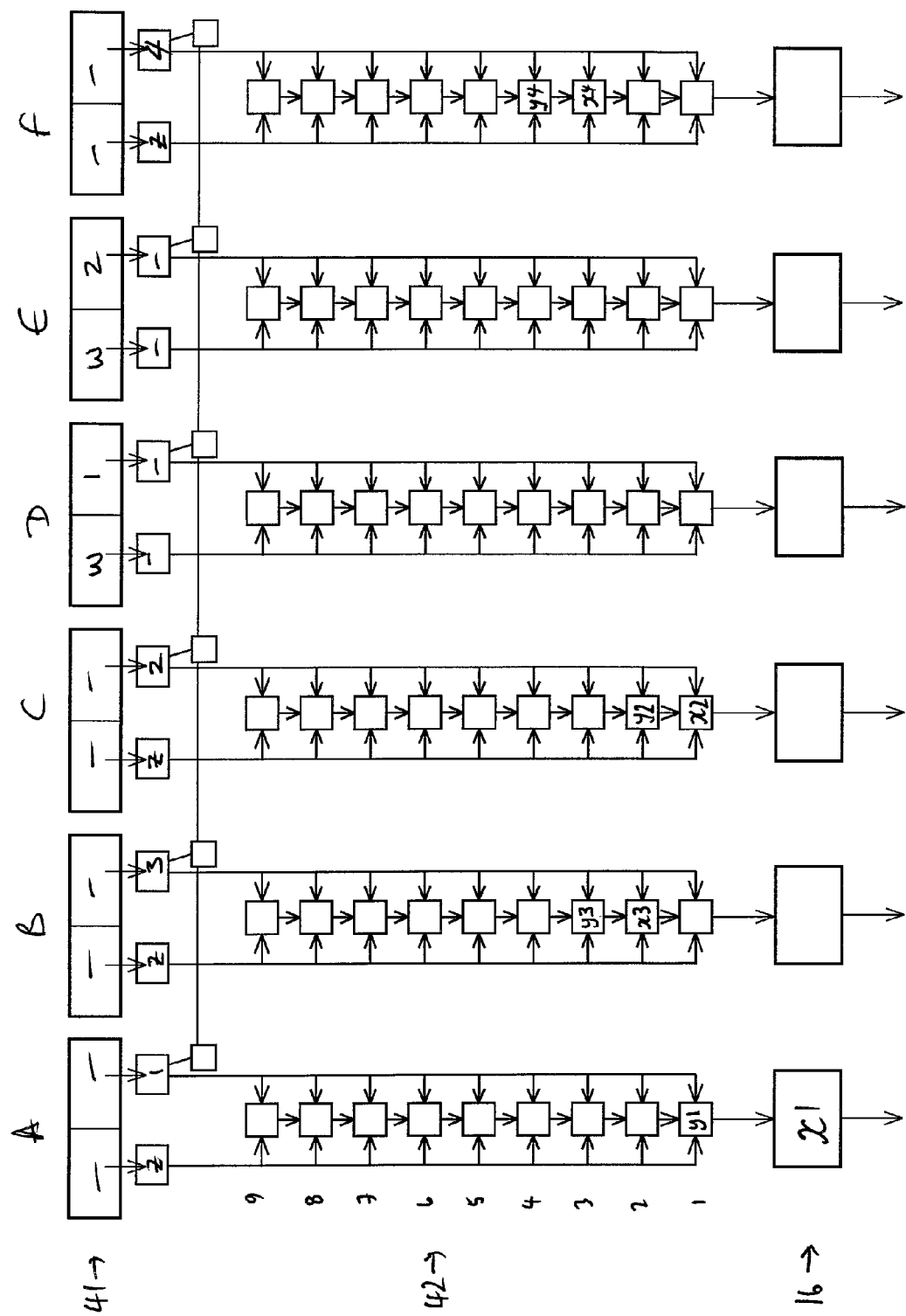

As shown in FIG. 12, after a further clock cycle, the first x sequence instruction x1 is transferred to the appropriate function unit (16A), with each of the other x-sequence instructions being moved along in the pipeline 42 by one position closer to the function units 16. Thus, the second x-sequence instruction x2 is moved to position 43C1, x3 is moved to 43B2 and x4 is moved to 43F3. The first x-sequence instruction x1 is available for processing by the function unit 16A on the next clock cycle.

The instructions for the y-sequence are loaded into the pipeline 42 at appropriate positions. In this example, the y-sequence instructions match those for the x-sequence, and are therefore placed in the pipeline 42 queueing behind the corresponding x-sequence instruction. In this case, that results in the first y-sequence instruction y1 being loaded into position 43A1, the second y-sequence instruction y2 into the position 43C2, the third instruction y3 into 43B3 and the fourth instruction y4 into 43F4. The instructions for the z-sequence are loaded into the instruction handlers 44 and timing controllers 46.

Figure 13:
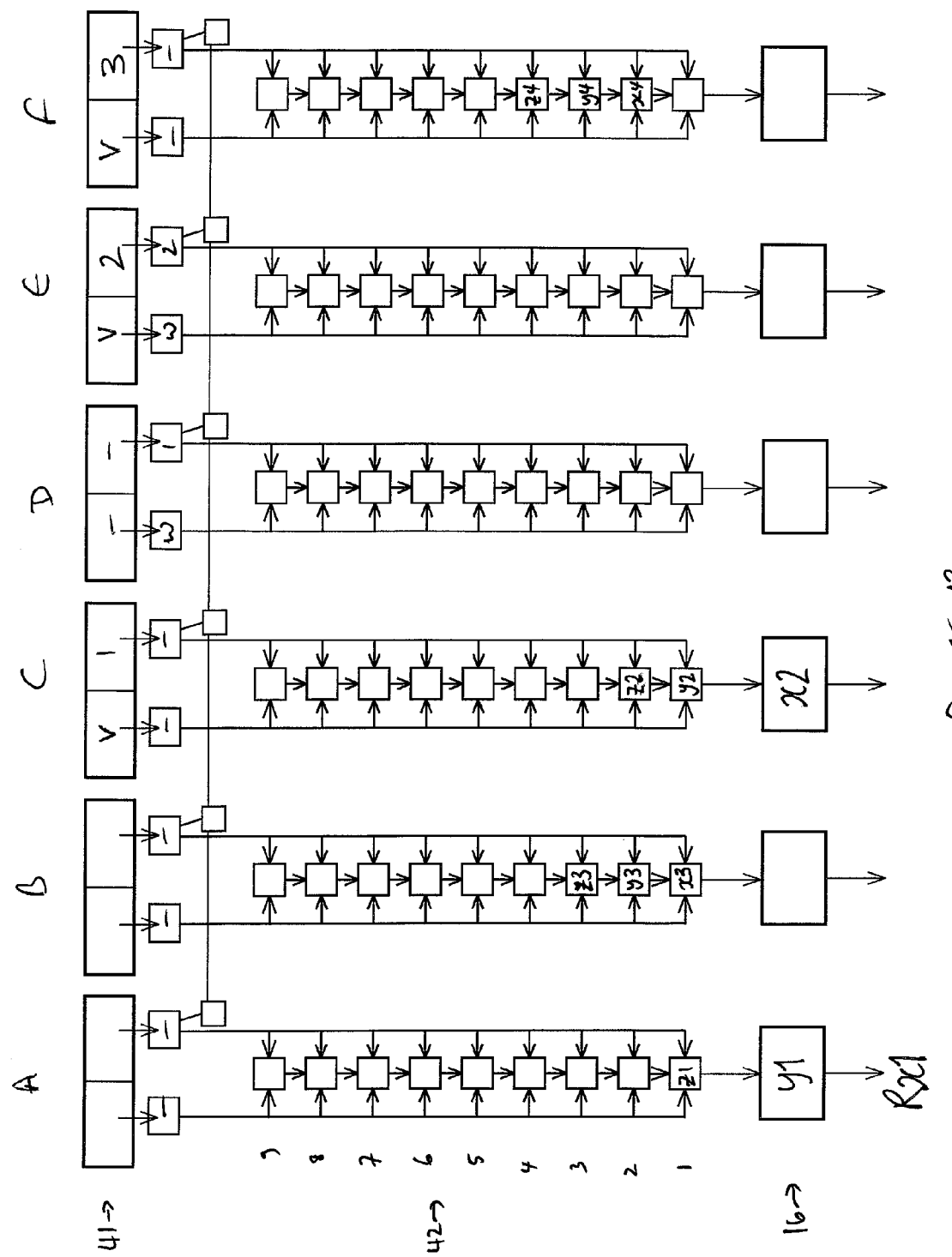

After a further clock cycle, as illustrated in FIG. 13, the result Rx1 of the execution of x-sequence instruction x1 is available at the output of the functioning unit 16A. All other instructions are moved one place closer to the function units, with x-sequence instruction x2 being loaded into function unit 16C for execution on the next clock cycle, and y-sequence instruction y1 being loaded into function unit 16A for execution on the next clock cycle. The z-sequence instructions, which are identical to the x and y sequence instructions, are loaded into appropriate locations in the pipelines 42, as illustrated in FIG. 13. Since the x, y, and z sequences form a single super-sequence, the instructions are able to be loaded into the pipeline, and hence executed by the function units, with minimal delay between instructions, as illustrated in FIG. 13.

The w-sequence instructions are loaded into the instruction handlers 44 and timing controllers 46, with the v-sequence instruction loaded into the register 41.

Figure 14:
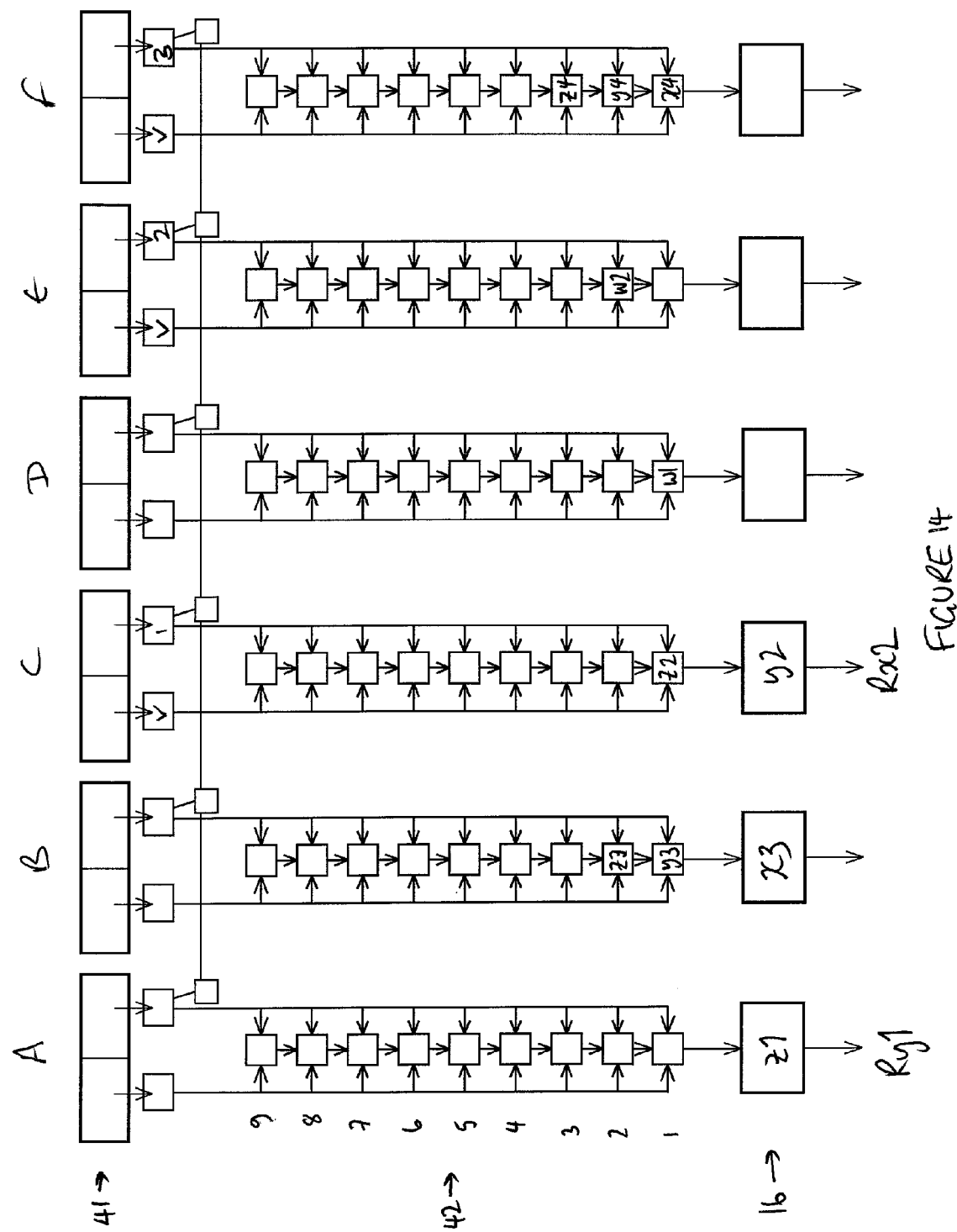

After a further clock cycle, the illustration in FIG. 14, the result Rx2 of the execution of the second x-sequence instruction x2 is available at the output of function unit 16C. The result Ry1 of the processing of the first y-sequence instruction y1 is available at the output of the first function unit 16A. The third x-sequence instruction x3, the second y-sequence instruction y2 and the first z-sequence instruction z1 are loaded into respective function units 16B, 16C and 16A for execution on the next clock cycle. All other queued instructions are moved one place closer to the function units 16 in the pipeline 42.

The w-sequence instructions w1 and w2 are placed in the pipeline at an appropriate position. The w-sequence is not part of the xyz super-sequence, and so the timing controller 46 must take notice of the position information provided by the position detectors 48 in order to determine the appropriate locations for the w-sequence instructions in the pipeline 42. In this case, the instructions w1 and w2 make use of function units which are not executing instructions in the x, y and z sequences. As such, the position detectors 48 do not generate any position information.

Accordingly, the instruction handlers 44 are able to insert the w1 and w2 instructions as close as possible to the appropriate function units (16D and 16E) in columns D and E of the instruction controller. In this way, it is possible to execute instructions from the w sequence in advance of non-interfering instructions in other sequences, thereby reducing latency of execution of the w-sequence.

On this same clock cycle, v-sequence instructions are loaded into the instruction handlers 44 and timing information into the timing controllers 46.

Figure 15:
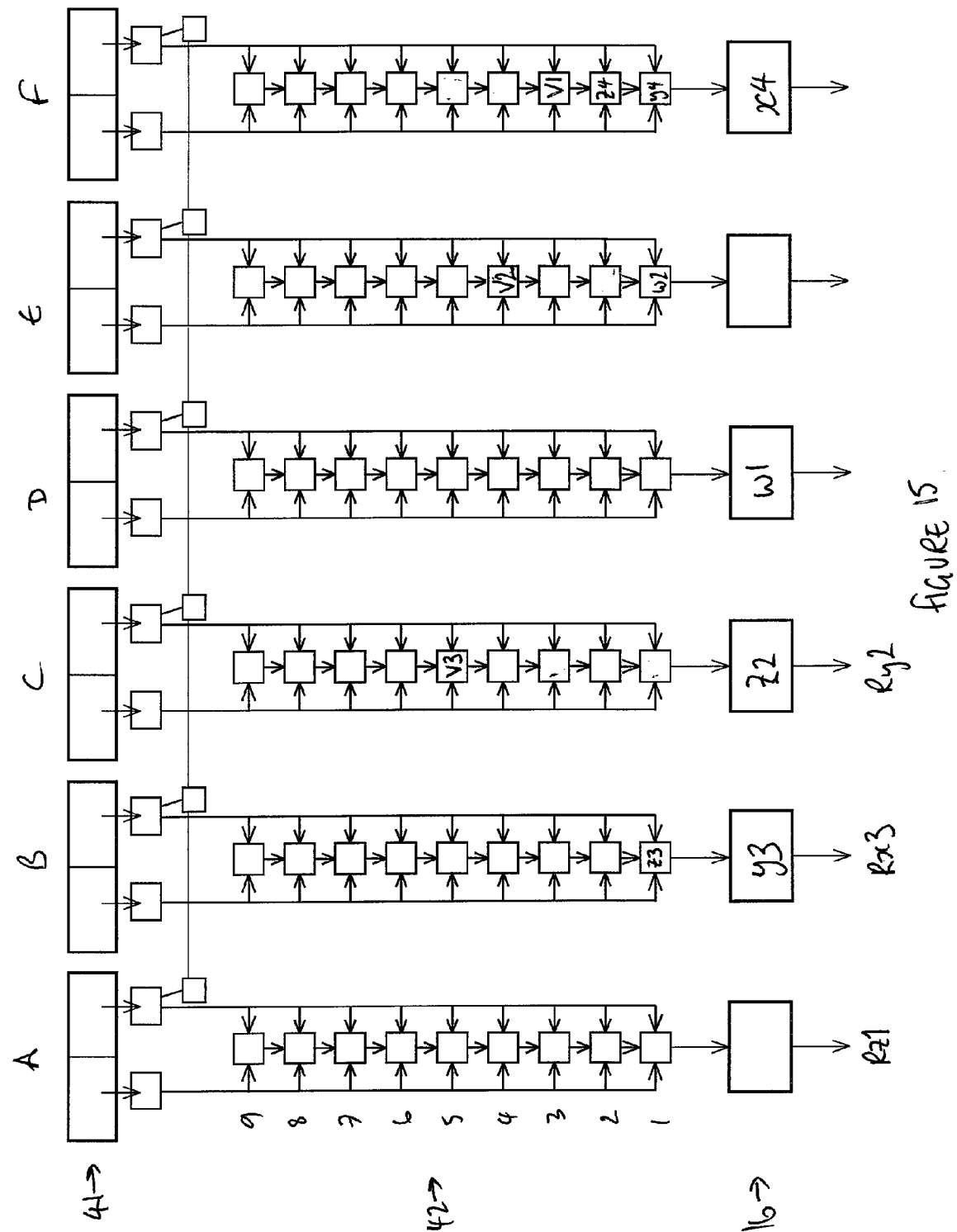

As shown in FIG. 15, after a further clock cycle, the results Rx3 of the execution of the third x-sequence instruction x3 is available at the output of function unit 16B, the result Ry2 of processing of the second y-sequence instruction is available at the output of the function unit 16C, and the result Rz1 of processing the first z-sequence instruction is available at the output of the function unit 16A. All of the other queued instructions are moved one place closer to the function units 16, or into the function units themselves, resulting in the fourth x-sequence x4 instruction being ready for execution in the function unit 16F, the third y-sequence instruction y3 being ready for execution in the function unit 16B, and the second z-sequence instruction z2 being ready for execution in the function unit 16C. In addition, the first w-sequence instruction w1 is ready for execution in the function unit 16D. It will be noted that the w sequence processing is interleaved with the x, y and z sequence processing, and this is possible because the w-sequence instructions do not make use of function units used by those other sequences.

The v-sequence instructions v1, v2 and v3 are placed at appropriate points in the pipeline of the respective function units 16C, 16E and 16F. Unlike the w sequence instructions, however, the v-sequence instructions make use of at least one function unit used by another sequence (in this case sequences x, y and z, and function unit 16F). Since the v-sequence is not part of the xyz super-sequence it is important that the sequences of instructions do not overlap with one another, since such overlapping may cause data conflict issues.

In order to detect and control the positioning of the potentially overlapping sequence instructions, each of the pipelines and each of the columns includes the position detector 48. The position detector 48 stores the latest position that contains an instruction in the column concerned and broadcasts this position to the position detection unit 48 of each of the other columns. When a new instruction is received the position detector determines whether there is an instruction already queued in the pipeline column to which it relates, and if so this is indicated to the timing controllers 46. Each of the position detectors 48 in which an instruction is detected reports the position of the instruction, so that the highest position in the pipeline for the existing sequence can be determined. The new instruction sequence must then be placed at a position at least one higher than this highest position, in order that the new sequence can be placed at an appropriate non-interfering position within the pipeline.

In this case, the last instruction from the x, y and z sequences to be processed is instruction z4, on function unit 16F. In other words, the fourth instruction z4 of the z-sequence is highest placed in the pipeline. At the time of placement of the v-sequence instructions into the pipelines, instruction z4 is held at location 43F2, and so the first instruction v1 in the v-sequence must not be placed in a location less than or equal to the fourth instruction z4 of the z-sequence. Therefore, the first instruction v1 of the v-sequence is placed at position 3 for its appropriate function unit. In this example, v1 is therefore placed in position 43F3. This positioning ensures that the first instruction of the v-sequence does not overlap with any instructions in the xyz super-sequence. This ensures that the data and results available through the v-sequence do not clash with those available and used for the xyz super-sequence.

The remaining v-sequence instructions v2 and v3 then have their initial positions determined with respect to the first v-sequence instruction v1 in order that the timing of the v-sequence is maintained, and ensures that the v-sequence does not overlap with the existing independent sequence in the instruction pipeline. Thus the second v-sequence instruction v2 is placed at 43E4, and the third at 43C5. This placement ensures that the v-sequence instructions are executed in an appropriate order, without interference with the xyz super-sequence.

The v-sequence shown in FIG. 15 is a simplified example to show the principles of the present invention. In more complex examples, the v-sequence may overlap in time with the existing sequence or sequences in the instruction pipeline as a whole, but not in an individual pipeline for a specific function unit. The timing of the v-sequence sequence is determined by the timing required to ensure that instructions in any one pipeline do not overlap or become interleaved in that pipeline.

Figure 16:
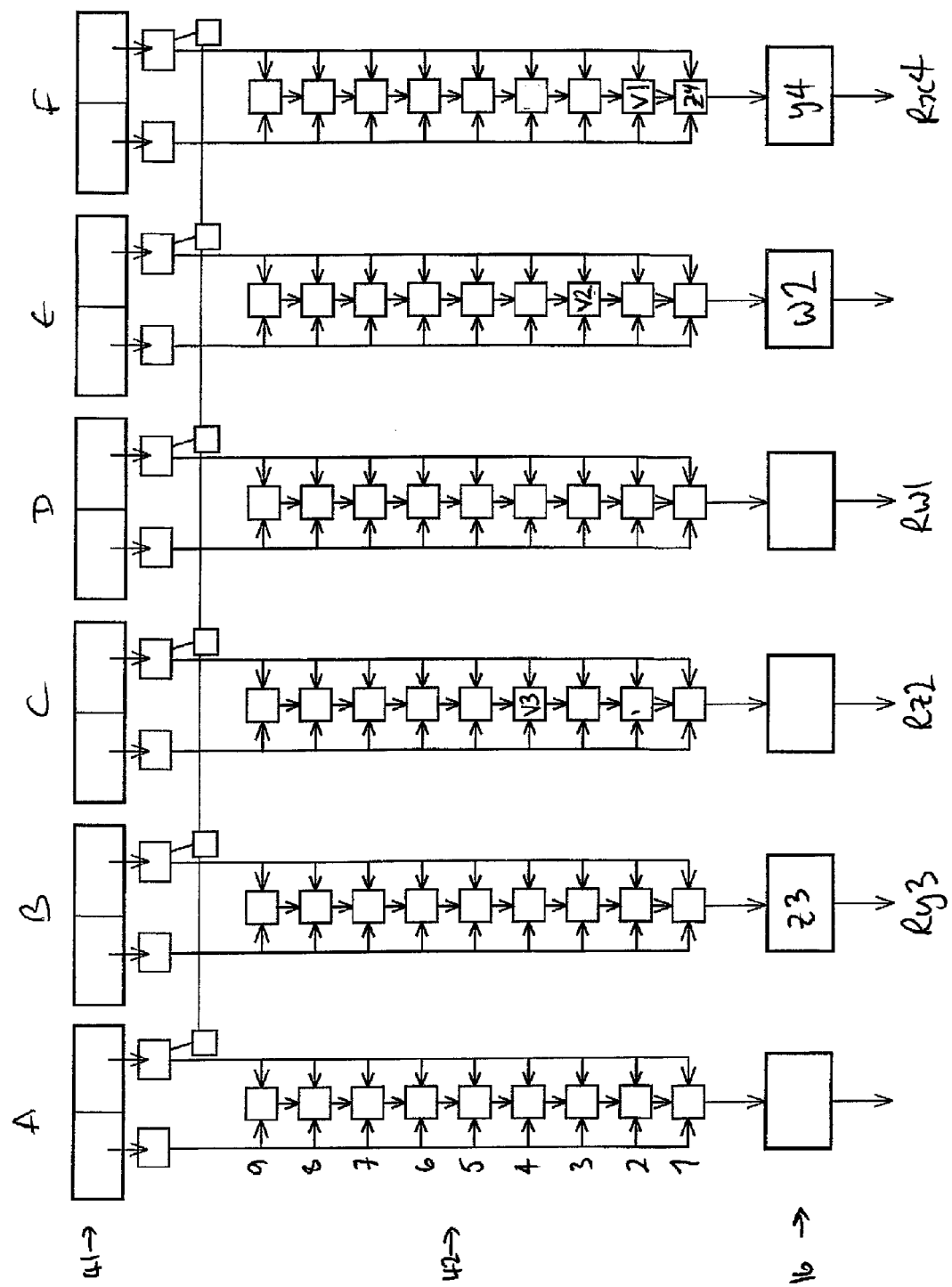

As shown in FIG. 16, after a further clock cycle the result Rx4 of the execution of the fourth x-sequence instruction x4 is available at the output of the function 16F. In addition, the result Ry3 of the execution of the third y-sequence instruction y3 is available at the output of function unit 16B, the result Rz2 of the execution of instruction z2 is available at the output of function unit 16C, and the result Rw1 of the execution of the first w-sequence instruction w1 is available at the output of the function unit 16D. The fourth y-sequence instruction y4, the third z-sequence instruction z3 and the second w-sequence instruction w2 are placed at the appropriate function units for execution thereby. The remaining queued instructions are moved one place further towards the function units in the pipeline 42.

Figure 17:
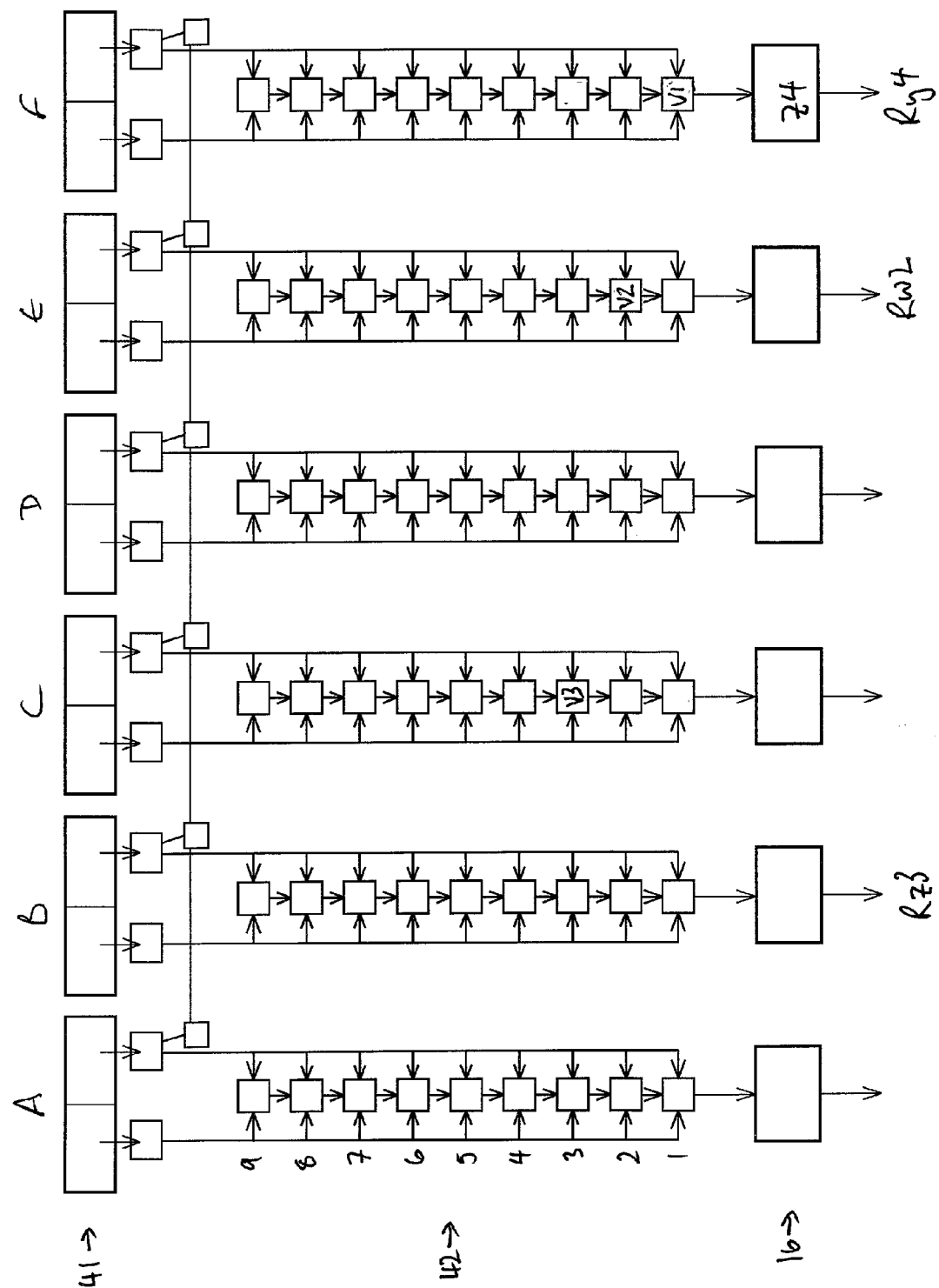

FIG. 17 shows the location of the instructions after a further clock cycle, and that the result Ry4 of the execution of the fourth y-sequence instruction y4 is available at the output of function unit 16F, the result Rz3 of the execution of the third z-sequence instruction is available at the output of the function unit 16B and the result Rw2 of the execution of the second w-sequence instruction is available at the output of the function unit 16E. The fourth z-sequence instruction z4 is available for execution by the function unit 16F, and the v-sequence instructions v1, v2 and v3 are moved closer to the function units 16.

FIG. 17 illustrates how the v sequence instructions do not overlap with processing of the x, y and z sequence instructions, since the first v-sequence instruction v1 is queued for execution directly after the fourth z-sequence instruction, which is the last of the instructions in the x, y and z sequences.

Figure 18:
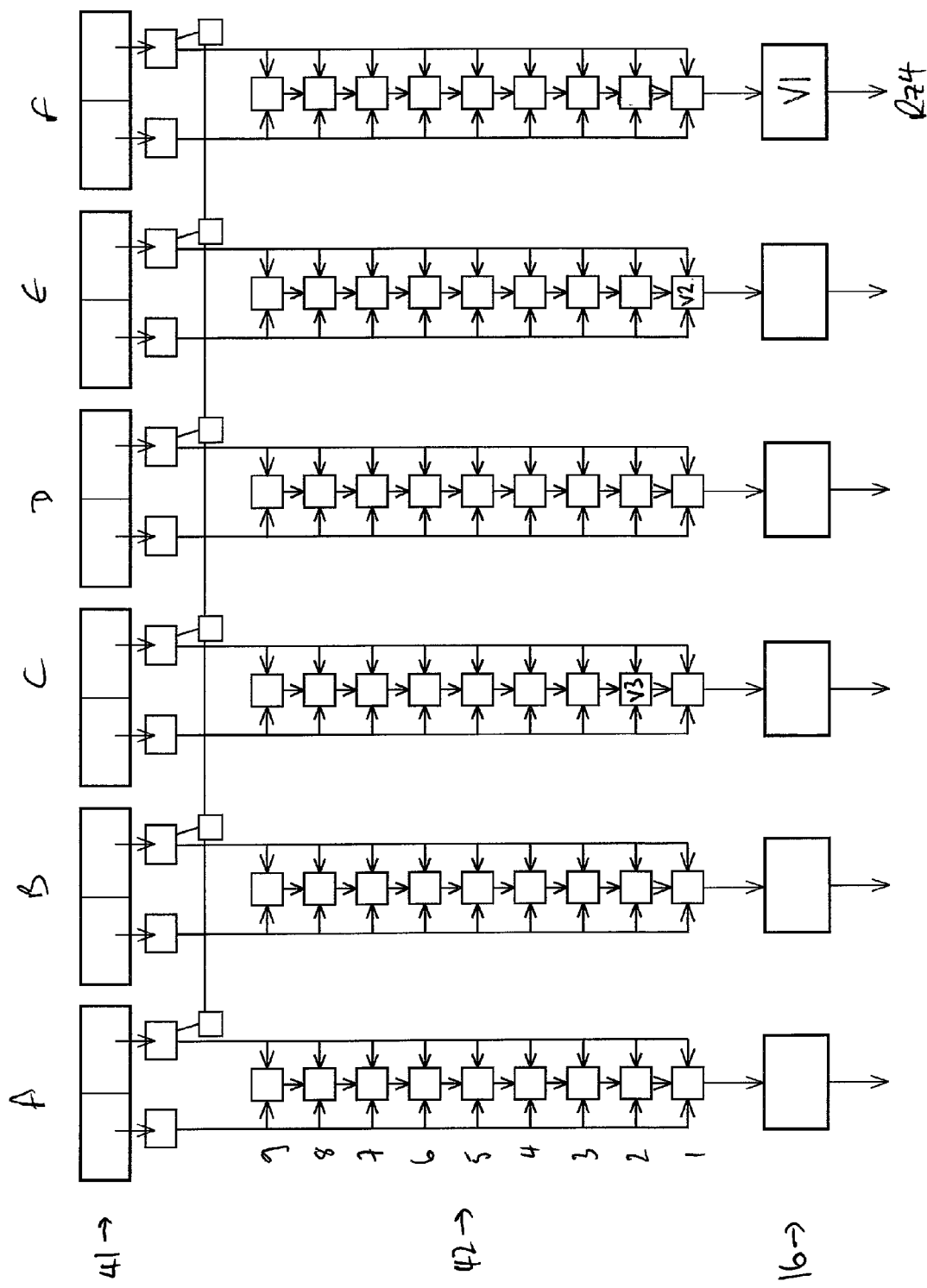

FIG. 18 illustrates the position after a further clock cycle, in which the result Rz4 of the execution of the fourth z-sequence instruction z4 is available at the output of the function unit 16F.

The first of the v-sequence instructions v1 is available for execution on the next clock cycle of the function unit 16F, with the second and third v-sequence instructions v2 and v3 being moved along the pipeline 42 towards their respective function units. Thus, the first of the instructions for the v-sequence is not executed until after the execution of the last of the instructions for the xyz super-sequence.

Figure 19:
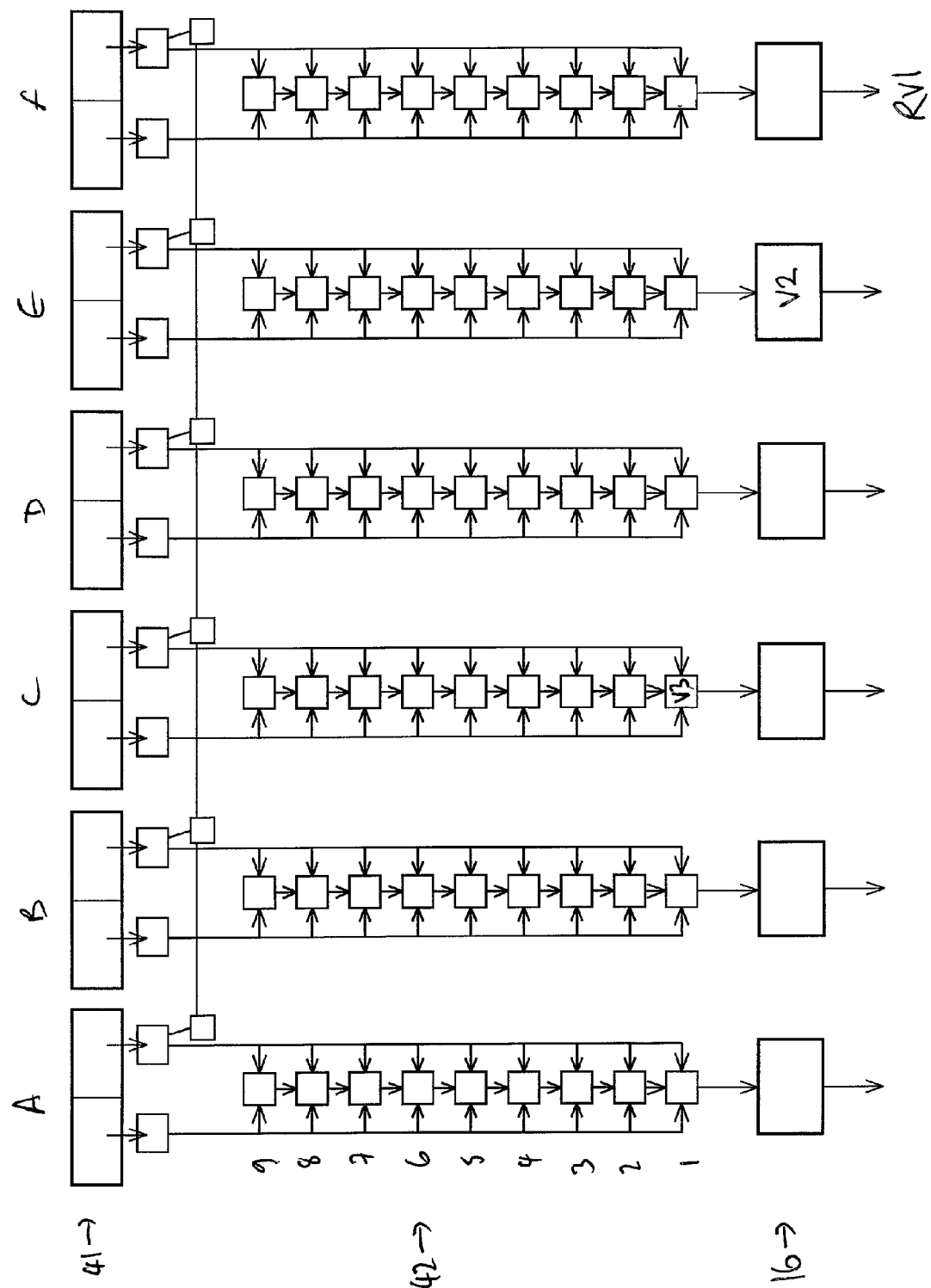

FIG. 19 shows a situation one clock cycle later in which the result Rv1 of the execution of the first v-sequence instruction v1 is available at the output of the function unit 16C. Instruction v2 is placed in function unit 16E for execution, with instruction v3 being moved one location closer to the function unit 16C.

Figure 20:
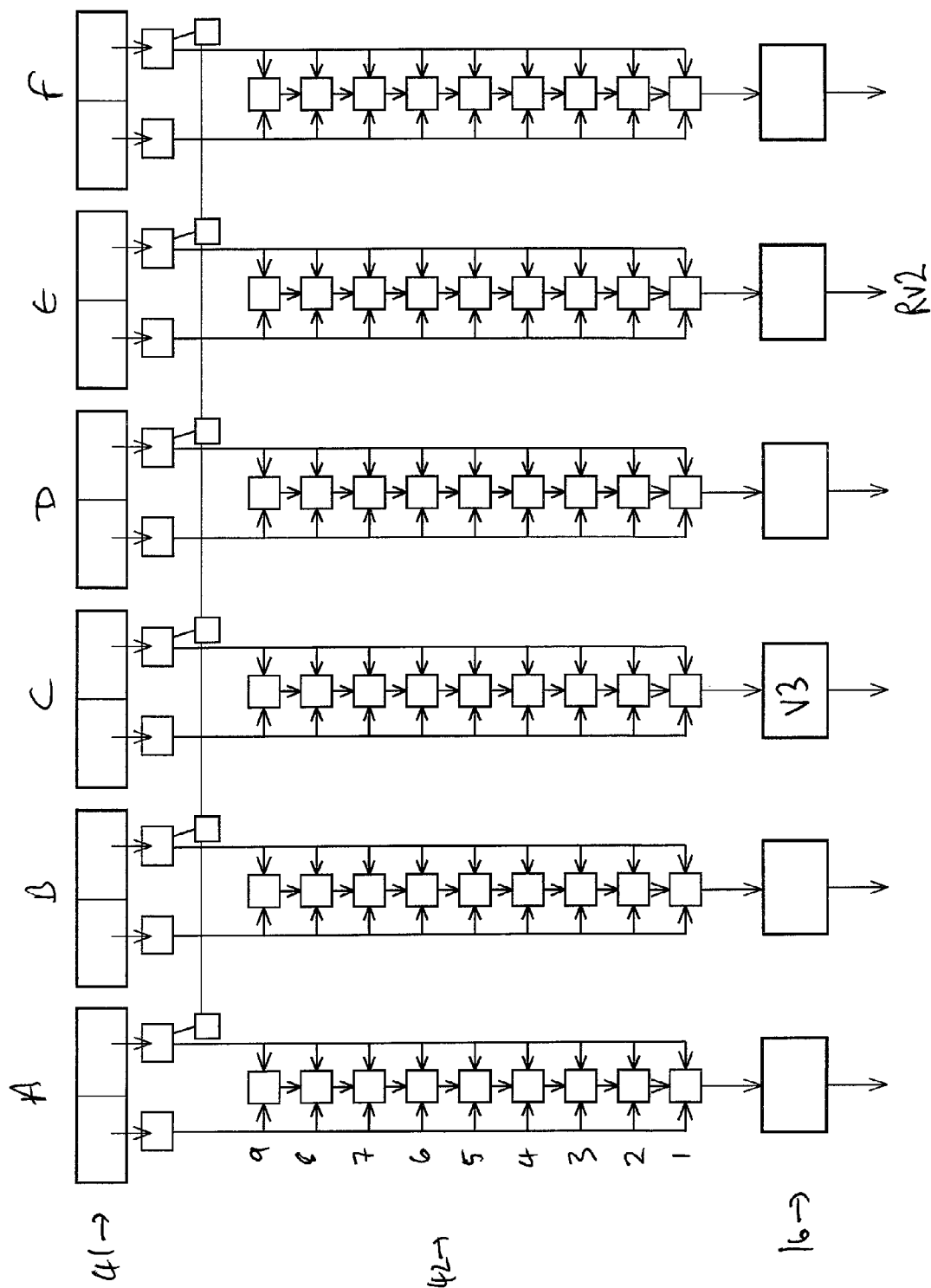

FIG. 20 shows a situation one further clock cycle later in which the result Rv2 of execution of the second v-sequence instruction v2 is available at the output of the function unit 16E, with the third instruction of the v sequence v3 being available for processing by the function unit 16C for the next clock cycle.

Figure 21:
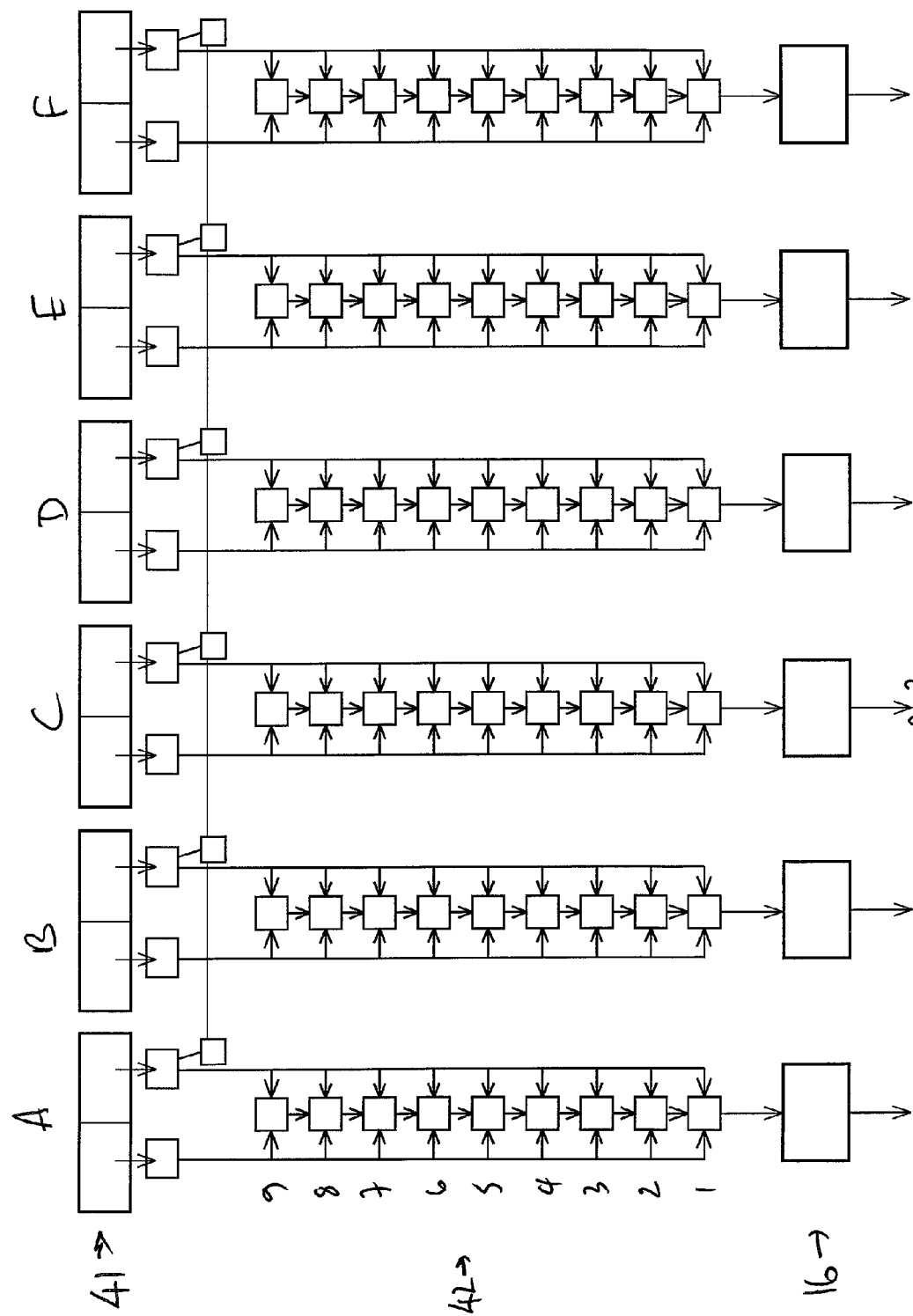

Finally, FIG. 21 illustrates that the third instruction of the v sequence v3 has been executed with the result rv3 is available at the output of the function unit 16C.

Although FIGS. 9 to 21 show the processing of five instruction sequences, it will be readily appreciated that the techniques is applicable to any number of sequences of instructions.

Figure 22:
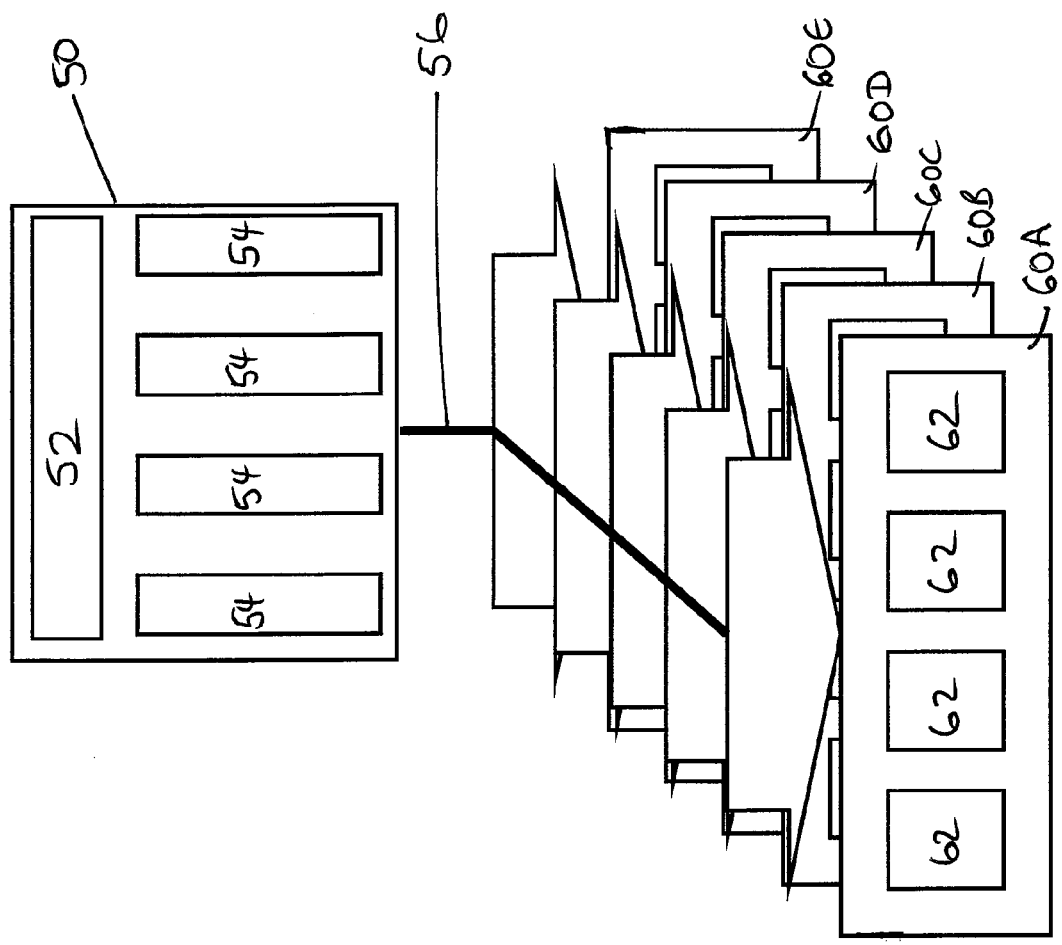
FIG. 22 illustrates a single instruction multiple data (SIMD) architecture.

As mentioned above, the principles of the present invention have been described with reference to a single controller supplying instructions to a single processing element. As will be readily appreciated, the controller may supply the instructions to a plurality of processing elements. One possible configuration of such a technique is illustrated schematically in FIG. 22, and provides a single instruction multiple data instruction (SIMD) architecture. A single instruction controller 50, comprising an instruction register 52 and a plurality of instruction pipelines 54, communicates instructions through the pipelines in the manner described above. The pipelines 54 are connected to deliver instructions in parallel to respective function units 62 of a plurality of processing elements 60A to 60E via an instruction bus 56. It will be appreciated that the number of processing elements 60, function units 62 and pipelines 54 shown in FIG. 22 is merely exemplary and the principles of the present invention are applicable to any number of those units. In such a manner, an embodiment of the present invention is able to provide lower latency processing of multiple sequences of instructions.

Although aspects of the invention have been described with reference to the embodiment shown in the accompanying drawings, it is to be understood that the invention is not limited to the precise embodiment shown and that various changes and modifications may be effected without further inventive skill and effort.

The invention claimed is:

1. A method of delivering instructions to a processing element having a plurality of function units arranged in parallel with one another, using an instruction controller having a plurality of instruction pipelines associated with respective function units of the processing element, the method comprising:
   a. receiving an instruction word, which includes a plurality of instructions, each instruction belonging to an instruction sequence, and having a timing value indicative of a relative timing for execution of the instruction in the instruction sequence to which the instruction belongs;
   b. supplying the instructions to respective instruction pipelines of the instruction controller in dependence upon a function of the instruction concerned, the instructions being supplied to respective initial positions within the respective instruction pipelines, the initial positions being determined by the timing value of the instruction concerned, and by relative timing between instruction sequences; and
   c. propagating such instructions through the instruction pipelines to respective function units of the processing element, such that the instructions for an instruction sequence are delivered to the associated function units for execution in an order determined by the timing value for the instructions of that instruction sequence.

2. A method as claimed in claim 1, wherein the instructions are supplied to the instruction pipeline such that delay between processing instructions in adjacent instruction sequences is minimized.

3. A method as claimed in claim 1, wherein the initial timing positions are determined such that adjacent instruction sequences do not overlap in time on any one instruction pipeline.

4. A method as claimed claim 1, wherein each instruction pipeline comprises a series of storage units, each of which is operable to store a instruction for a predetermined number of system clock cycles, and wherein the method includes, after a predetermined number of system clock cycles, for each such unit except the last in the series, passing a stored instruction the next unit in the series, and, for the last unit in the series, passing a instruction to the function unit of the processing element associated with the instruction pipeline concerned.

5. A method as claimed in claim 1, wherein relative timing between instruction sequences is determined by detecting a position in at least one instruction pipeline for an instruction belonging to a first instruction sequence, detecting whether an instruction from a second instruction sequence is destined for execution at the same function unit as an instruction from the first instruction sequence, such an instruction from the second instruction sequence being a detected instruction, and, if so, determining an initial position in the pipeline the detected instruction such that the detected instruction does not overlap in time with the first instruction sequence, and determining initial positions for any remaining instructions in the second instruction in dependence upon the initial position of the detected instruction.

6. A method of executing instructions on a processing element having a plurality of processing elements, the method comprising steps of a method as claimed in claim 1, and executing instructions on respective function units of the processing element.

7. An instruction controller for supplying instructions to a processing element having a plurality of function units operable to execute respective functions in dependence upon received instructions in parallel with one another, the controller comprising:
   a. a plurality of instruction pipelines, each of which is operable to deliver instructions to an associated function unit of a processing element for execution thereby, each instruction belonging to an instruction sequence, and having a timing value indicative of a relative timing for execution of the instruction in the instruction sequence to which the instruction belongs;
   b. wherein each instruction pipeline comprises:
      i. a plurality of storage units, arrange in a series and operable to store an instruction therein, each storage unit, except the last in the series, being operable to transfer an instruction to the next unit in the series, the last unit in the series being operable to transfer an instruction to an associated function unit of a processing element associated with the instruction pipeline concerned;
      ii. a timing controller operable to receive timing information for a received instruction, and to determine an initial storage unit into which the instruction is to be loaded, the initial storage unit being determined by the timing value of the instruction concerned, and by relative timing between instruction sequences;
      iii. an instruction handler operable to receive an instruction for the function unit associated with the instruction pipeline concerned, and to load that instruction into a storage unit determined by the timing controller;
   c. and wherein each instruction pipeline is operable to propagate an instruction from the initial storage unit determined by the timing controller to a function unit associated with the pipeline concerned.

8. A controller as claimed in claim 7, wherein the timing controller is operable to determine an initial storage unit for an instruction such that the instructions are supplied to the instruction pipelines such that delay between execution of instructions in adjacent instruction sequences is minimized.

9. A controller as claimed in claim 7, wherein each instruction pipeline includes a position detector operable to determine a position of an instruction in the instruction pipeline concerned, and to transmit position information to the timing controllers of the instruction pipelines, and wherein the timing controllers are operable to use received position information in determining the initial storage unit for an instruction.

10. A controller as claimed in claim 7, wherein the timing controller of each pipeline is operable to determine relative timing between instruction sequences by detecting a position in at least one instruction pipeline for an instruction belonging to a first instruction sequence, detecting whether an instruction from a second instruction sequence is destined for execution at the same function unit as an instruction from the first instruction sequence, and, if so, determining a position in the pipeline such that the second instruction sequence does not overlap in time with the first instruction sequence.

11. A processing device comprising:
   a. a processing element having a plurality of function units operable to execute respective functions in dependence upon received instructions in parallel with one another; and
   b. an instruction controller comprising:
      a plurality of instruction pipelines, each of which is operable to deliver instructions to an associated function unit of the processing element for execution thereby, each instruction belonging to an instruction sequence, and having a timing value indicative of a relative timing for execution of the instruction in the instruction sequence to which the instruction belongs;

wherein each instruction pipeline comprises:
  i. a plurality of storage units, arrange in a series and operable to store an instruction therein, each storage unit, except the last in the series, being operable to transfer an instruction to the next unit in the series, the last unit in the series being operable to transfer an instruction to an associated function unit of a processing element associated with the instruction pipeline concerned;
  ii. a timing controller operable to receive timing information for a received instruction, and to determine an initial storage unit into which the instruction is to be loaded, the initial storage unit being determined by the timing value of the instruction concerned, and by relative timing between instruction sequences;
  iii. an instruction handler operable to receive an instruction for the function unit associated with the instruction pipeline concerned, and to load that instruction into a storage unit determined by the timing controller;

and wherein each instruction pipeline is operable to propagate an instruction from the initial storage unit determined by the timing controller to a function unit associated with the pipeline concerned.

* * * * *